United States Patent [19]

Sloyan

[11] 4,120,210

[45] Oct. 17, 1978

[54] MOUNT FOR MOTOR HAVING VARIABLE PITCH PULLEY

[75] Inventor: Jerome J. Sloyan, Trenton, N.J.

[73] Assignee: Automatic Motor Base Co., Windsor, N.J.

[21] Appl. No.: 705,456

[22] Filed: Jul. 15, 1976

[51] Int. Cl.² .................. F16M 11/04; F16M 7/00
[52] U.S. Cl. ................. 74/242.13 R; 74/230.17 B; 248/23
[58] Field of Search .............. 248/23; 74/230.17 B, 74/242.13 R, 242.13 A; 108/54.1

[56] References Cited

U.S. PATENT DOCUMENTS

| | | | |
|---|---|---|---|
| 1,463,406 | 7/1923 | Serrell et al. | 74/242.13 A |
| 1,941,417 | 12/1933 | Reeves | 74/230.17 B |
| 2,089,381 | 8/1937 | Kassing | 74/242.13 R |
| 2,202,553 | 5/1940 | Heyer | 74/230.17 B |
| 2,247,552 | 7/1941 | Heyer | 74/230.17 B |
| 2,456,039 | 12/1948 | Abramson | 248/23 |
| 2,510,680 | 6/1950 | Byrnes | 248/23 |
| 2,646,951 | 7/1953 | Sloyan | 248/23 |
| 2,762,663 | 9/1956 | Sloyan | 248/23 |
| 2,833,597 | 5/1958 | Sloyan | 248/23 |
| 2,934,384 | 4/1960 | Sloyan | 248/23 |
| 2,967,688 | 1/1961 | Sachers | 248/23 |
| 3,017,226 | 1/1962 | Sloyan | 248/23 |
| 3,065,523 | 11/1962 | Sloyan | 248/23 |
| 3,834,657 | 9/1974 | Freitas, Jr. | 74/242.13 R |
| 3,908,941 | 9/1975 | Bromley et al. | 74/242.13 R |
| 3,977,333 | 8/1976 | Phillips | 248/23 |

Primary Examiner—Samuel Scott
Assistant Examiner—W. R. Henderson
Attorney, Agent, or Firm—Mawhinney & Mawhinney & Connors

[57] ABSTRACT

A motor mount having novel means for maintaining the belt from the motor to the driven instrumentality in constant undeviated alinement notwithstanding that a variable pitch pulley is used, of which one flange is axially slidable and the other flange is nonslidable, but wherewith relative lateral displacement between the pulley flanges and belt is compensated for simultaneously with the varying of the pitch diameter of engagement of the belt with said flanges.

9 Claims, 8 Drawing Figures

MOUNT FOR MOTOR HAVING VARIABLE PITCH PULLEY

DRAWINGS

GENERAL CONSIDERATIONS

Figure 1:
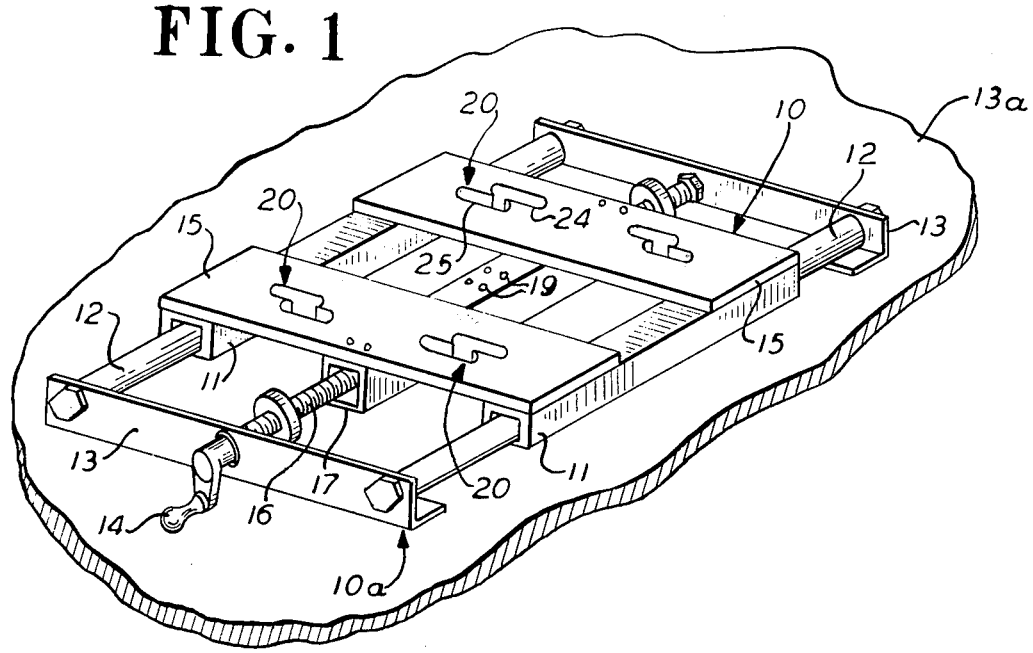
FIG. 1 is a perspective view of a motor mount constructed in accordance with the present invention.

Viewed initially in its broad aspect, the invention is directed to an improved mount or base for electric motors equipped with spring loaded variable pitch driving pulleys. The art is replete with many diverse types of bases or mounts usually designed for specific known makes of spring loaded variable pitch pulleys, each having one fixed and one slidable flange. Those presently on the market are generally products of the manufacturer of the specific pulley and made by them for use therewith.

The various means heretofore employed to accomplish some desired results vary considerably. In one example the carriage is a casting or steel plate in which stud-fitting holes are drilled at exact positions by the manufacturer to meet specific requirements involved. In another instance, a rotatable member or turntable is superimposed on the carriage, in yet another instance the carriage is not of one piece, but is instead made of two individual plates to which the motor is bolted thereto to make the plates function as a unit. In another one recently appearing on the market the carriage plates are castings in which arcuate slots are cored. It is essential that the carriage body shall not only be a consolidated, rigid unit, but that the gliders shall likewise be accurately unified therewith to provide a freely slidable assembly so imperatively needed in this type of base to effect an easy and rapid change of speed of drive. Notwithstanding the variety of bases available, none possess all of the features necessary to obtain best performance from variable pitch pulleys in the diverse situations where they are likely to be used with any one of the many different makes of pulleys.

The bases described in my prior U.S. Pat. Nos. 2,874,006 of Feb. 17, 1959 and 3,586,273 of June 20, 1971 of which several thousand have been manufactured and installed are adapted to have motors mounted thereon which, under certain conditions may be equipped with spring-loaded variable-pitch pulleys. For instance, where the driven or companion pulley is grooved to accomodate the 'V' belt used, the motor is equipped with a pulley having two movable flanges, both flanges are displaced an equal distance laterally simultaneously but in opposite directions. Thus the centerline between the flanges remains in constant alinement with the centerline of the groove in the driven pulley.

When the motor is equipped with a pulley having only one movable flange, and the belt is forced deeper between the flanges, the movable flange is displaced laterally, hence the centerline of the belt between the flanges is also displaced laterally in the same direction. In this type of installation the driven pulley has an uncrowned cylindrically flat peripheral face with which only the inner surface of the 'V' belt comes in contact. The uncrowned flat face of the driven pulley permits the belt to move laterally thereon in the same direction as it moves in the variable-pitch pulley so alinement of the belt is thus maintained between the pulleys. The efficiency of the bases above mentioned, regardless of position of support, whether on the floor, ceiling or sidewall, is due largely to the integral or unified construction of the carriage augmenting free sliding of the gliders, which extend the full length of the carriage; the carriage is easily manipulated along the rails to obtain the desired changes in speed of the driven pulley.

The mount or base described in this disclosure incorporates all of the merits of the bases described in the above mentioned patents. In addition, it permits the base to be mounted at the proper angle to maintain the belt centerline between the pulley flanges in alinement with the centerline of the groove of the driven pulley, regardless of the make of variable pitch pulley used, or whether or not the motor shaft and driven shaft are in a common plane parallel to the surface on which the base is mounted, whether secured to floor, ceiling or side wall, or regardless on which side of the motor the shaft extends, and regardless of which one of the two of a paired size of motor frames is used. As to this feature, and by way of explanation, mention may be made that with motors constructed in accordance with National Electrical Manufacturers Association (NEMA) standards, the distance between the holes in the feet of the motor measured perpendicular to the shaft, designated as E, are the same for each of the two motors of a paired size of frames, namely, motors identified in the trade with either of two three-digit numbers such for instance as 182/184, 213/215, etc. With motors having larger frame size and numbers of each pair, the distance between the hole centers in the feet measured parallel to the shaft is greater. This larger size dimension is designated in the trade as F2 and with the smaller frame size as F1. While the E dimension is the same for both of the paired frames the trade designated dimensions F1 and F2 differ slightly, but a given size of base or mount of my present invention accomodates either, so designation of that dimension only as F is used herein. Most motors from one to one hundred fifty horsepower are dimensioned in accordance with NEMA standards, and those dimensions determine the frame size of the motor. As regards the mount of my invention, the dimensions of chief concern are the center distances E and F between holes.

The present invention concerns itself with the use of any variable pitch pulley having one of its flanges slidable and the other one non-slidable, and in conjunction therewith the companion or driven pulley has a non-expanding V-groove for the V-belt. In considering the merits of the invention confined to the arrangement mentioned, it should be kept in mind that in order to maintain alinement of the belt with the fixed position of the groove of the driven pulley the base must be mounted at an angle other than perpendicular to the shaft of the driven pulley, and the motor mounted on the carriage of the base so that its shaft is parallel to the shaft of the driven pulley. The angle at which the base is mounted must be such that each increment of longitudinal movement of the carriage will be accompanied by a proportionate increment in its lateral movement so that at whatever diametral location the V-belt is in the groove of the variable pitch pulley, it will be in alinement with the centerline of the groove of the driven pulley.

DESCRIPTION

In the specific embodiment of the invention as illustrated in said drawings, involved therewith is an electric motor 1 commercially available and having a usual drive shaft 2 on which is carried a variable pitch driving pulley 3 of known construction provided with side flanges 4, 4a which, viewed in their entirety, are parallel to each other and perpendicular to shaft 2 and keyed to it so as to be rotated thereby.

Considering the variable pitch pulley 3 in somewhat greater detail, one of the flanges, herein designated flange 4, is axially slidable on the shaft 2 toward and away from the other or non-slidable flange 4a, and in the present showing the slidable flange 4 is the one most remote from the motor. The faces of the flanges 4, 4a which face toward each other are tapered at a predetermined angle providing a tapered groove 9 therebetween. The slidable flange 4 is urged by a spring 4b in an axial direction toward the companion nonslidable flange 4a tending to contract groove 9. A V-belt 5 extends from said variable pitch driving pulley 3 to a grooved driven pulley 6 fast on a driven shaft 7 of a positionally fixed instrumentality 8. Forcing belt 5 deeper in groove 9 of driving pulley 3 will, by virtue of wedging of V-belt 5 against the tapered faces of flanges 4, 4a, cause flange 4 to slide outwardly on shaft 2, the belt also having a lateral outward displacement commensurate with the taper of the face of the non-slidable flange. This type of variable pitch pulley is well known in the art, and its effective use is enhanced by the present invention which provides improved means for compensating for the lateral displacement above related.

The present invention is adaptable for use with practically any one of my previously patented constructions of motor mounts or bases utilizing a movable carriage and of which the one herein shown is arbitrarily selected for illustrative purposes. In accordance with the prior art, my patents and the present showing as well, provide bases or mounts each including essentially a fixed part and a movable part. The movable part is referred to as carriage 10 constituted in part by a plurality of cross-sectionally square and parallel glider tubes 11. The fixed portion of the mount, referred to as basal part 10a, is constructed in part, with parallel cylindrical rod-like rails 12 one each of which is within and makes sliding contact with the inner walls of glider tubes 11. The rails 12 are fixed at their ends in suitable headers 13 which in practice are bolted or otherwise secured immovably on a permanent surface 13a such as floor, ceiling, wall, bench or elsewhere.

The carriage 10 accordingly is slidable on said rails 12 in what may be termed forward and rearward directions under manual operation of a crank 14 at the front of the mount. The crank rotates a long screw 16 located between and parallel to said rails and is journaled at its ends in the headers 13. Said screw is also located for a part of its mid-portion length longitudinally through a cross-sectionally square housing tube 17, which, like glider tubes 11 is located under the carriage top, which may be a pair of cross-member plates 15, 15 (FIGS. 1–4) or single member or plate 15a (FIGS. 5–8). The carriage top thus has the form of a flat metallic rigid plate functioning as motor supporting means. All of said tubes are welded to the plates, or otherwise secured thereto, so as to unify them as major constituents of the carriage. Within and substantially fitting against the inner walls of the housing tube 17 and making threaded engagement with the afore said screw 16 there is a nut 18 held by pins 19 in relatively fixed location within said housing tube 17. Operation of crank 14 consequently serves to slide carriage 10.

Operating crank 14 to slide carriage 10 forwardly or further from driven pulley 6, sinks belt 5 deeper into groove 9 of variable pitch pulley 3 but since flange 4a of that pulley is non-slidable, the sinking transition against the taper of that non-slidable flange wedges the belt laterally, which, except for the correctional compensation afforded by the corresponding angular disposition of the mount or base would result in introducing a sidewise deflection or lateral slope of the belt in the reaches thereof extending between the driving and driven pulleys. This is detrimental and could not be tolerated.

Figure 3:
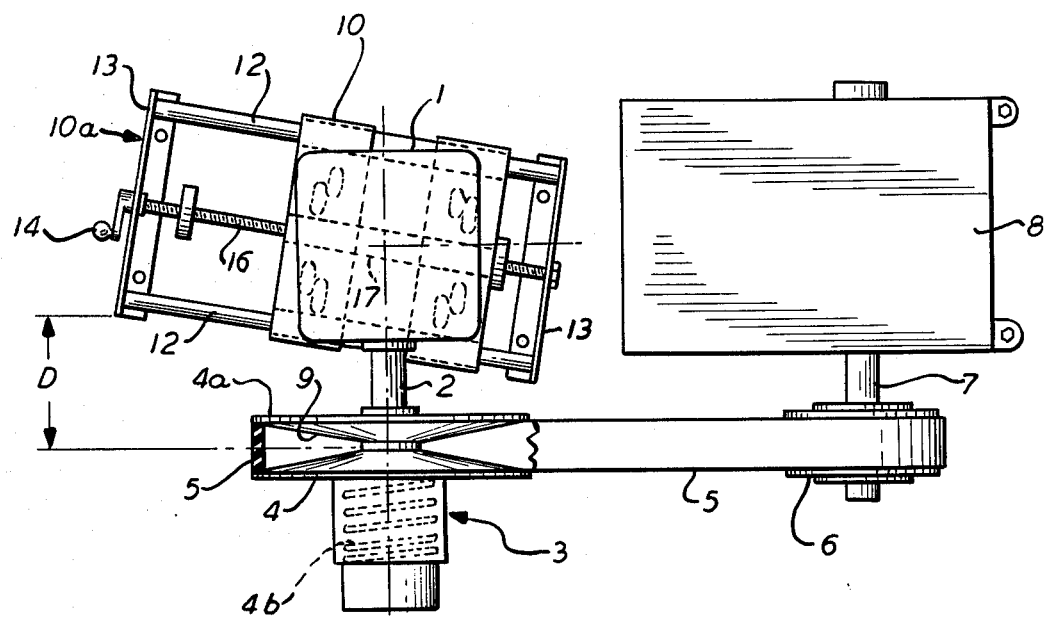
FIGS. 3 and 4 are plan views of an assembly of a motor on a motor mount in driving association with a fixed driven instrumentality and with the motor in high-speed and low-speed positions respectively.
Figure 4:
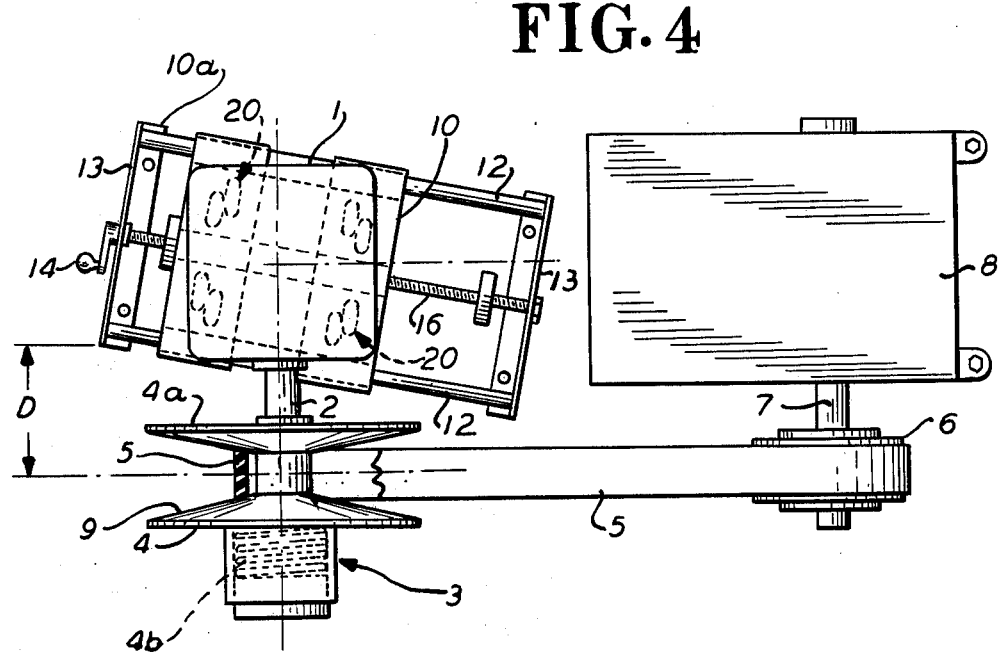

To compensate for the lateral wedging of belt 5, for instance when shifting from the high speed driving position of FIG. 3 to low speed of FIG. 4 which involves wedging the belt laterally in a direction away from the motor, the motor, including shaft and pulley, can be simultaneously retracted an equal amount, thereby progressively locating the non-slidable flange 4a nearer to the fixed part of the mount which supports the carriage. This desideratum may be accomplished by bolting the basal part 10a of the mount on a permanent surface 13a in a stationary position to lie diagonally or out of square to the driven instrumentality by an amount of twist appropriate to the particular set-up. Determination of the proper angular twist depends on the angularity of the flange face taper of the particular variable pitch pulley employed and on difference in elevation, if any, of the driving and driven shafts from the plane of the permanent surface 13a. The transverse movement transpires continuously throughout the longitudinal movement of the carriage 10, so normally with equal or adjusted angle of twist of the carriage to the angle of taper of the pulley face obtains like, but contra, lateral movement of the belt, thereby maintaining constant a distance D of the belt centerline from a fixed point of reference on the permanent surface 13a.

Basically the disclosure proposes relocation of the motor 1 on the carriage 10 so that the motor shaft 2 shall at all times be parallel to the driven shaft 7 of the instrumentality 8 and by a means readily available for use by a customer with any one of a plurality of commercially available variable pitch pulleys that the customer might purchase or happen to have with an accompanying motor. Securing the basal part 10a of the base or mount at the proper angle as outlined above is easily accomplished by the customer, but it poses difficulty for the customer, if required, to thereafter have to accurately drill holes in the assembled carriage for relocation of the motor on the carriage at the new angle of twist. So the invention proposes improved means for easy relocation of the motor on the carriage at a possible selected correct position to correspond with the particular angle and conditions involved with the particular pulley used and manner of use. Said means admits choice of location and angle of twist contra to twist of the mount, besides also accomodating any difference in elevation which may exist between the motor shaft and the driven shaft.

Essential to the present invention is provision for specially shaped and located portal openings 20 or 20a through the motor-supporting plates 15 or plate 15a of the carriage. These portal openings for the several sizes of motor mounts for the corresponding different motor frames are in each instance coextensive with all anticipated stud positions for passage of motor-securing studs 21 freely therethrough. The oversize of the portal openings is adequate to accomodate, where needed, adjusted twist of maximum and minimum $x$ and $y$ degrees, for example 15° and 6° respectively. These portal openings enable desired angle to be set readily and the motor secured by the customer in exact contra angularity to that of the mount on the permanent surface. In conjunction with studs 21, cleats 23 are provided underlying and spanning said portal openings. Each cleat has an appropriate hole therethrough for passage of a respective stud 21 tightening of which securely clamps the motor in place.

Figure 2:
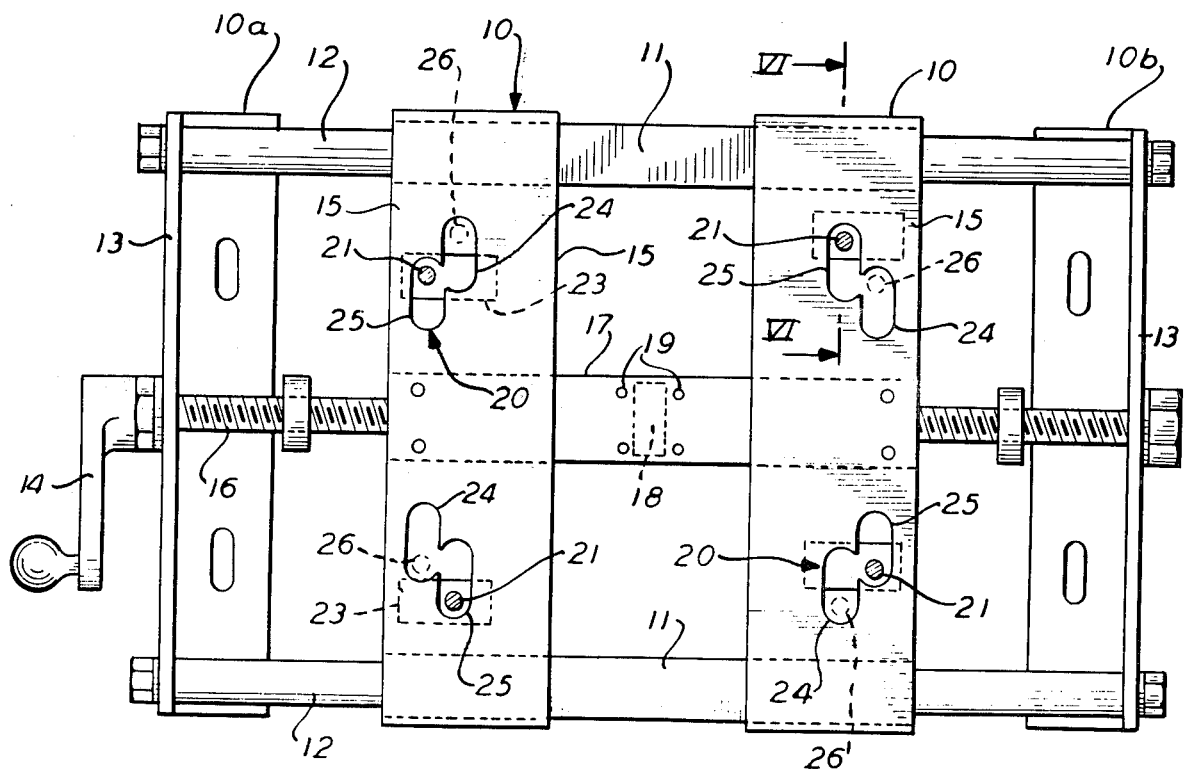
FIG. 2 is a sectional plan on a plane defined by the mutual surfaces of engagement of the motor feet with the top of the motor mount, so that only the studs for retaining the motor in fixed position on the motor mount appear in cross-section.

Referring specifically to FIGS. 1 to 4, each portal opening 20 comprises a pair of slots 24, 25, with all of the slots of the several portal openings situated parallel to each other crosswise of the base or mount. Each pair of slots provides for a considerable latitude for reception of stud 21 to accomodate disposition of the motor with twist to a left-hand angle as shown in FIGS. 3 and 4, and indicated by cross-hatched stud 21 location in FIG. 2 and to a corresponding right-hand twist indicated by a dotted line circle 26 of stud location in FIG. 2. Various other angular dispositions of the motor are available by other appropriate locations of the studs in the respective portal openings 20. The slot arrangement of FIG. 2 is well adapted for use with the smaller motors.

Alphabetical letters following numerical designations 24, 25 of the slots are used only when a particular slot is singled out. All of the slots are grouped in pairs, namely, a slot 24 with a a slot 25 constitute a pair, and each pair constitutes a portal opening 20 in FIGS. 1 and 2, or 20a in FIG. 5. The slots of each pair project in directions oppositely away from each other at so-called toe ends whereas at their so-called heel ends they lap at their proximate sides. Where, as in FIG. 2, by virtue of the E and F dimensional functions, it happens that at the areas of lap the slots of each pair intercommunicate, an additional advantage is derived in permitting the stud 21 to be shifted laterally from one to the other of said slots. It may also be mentioned that some variable pitch pulleys are used or made with the flange nearest the motor axially slidable and spring urged instead of the more remote one as herein specifically described as having that feature, and if for this or any other reason, the motor has a right-hand twist mentioned above, then the dotted-line circles 26 of FIG. 2 for locations of studs 21 would apply.

Figure 5:
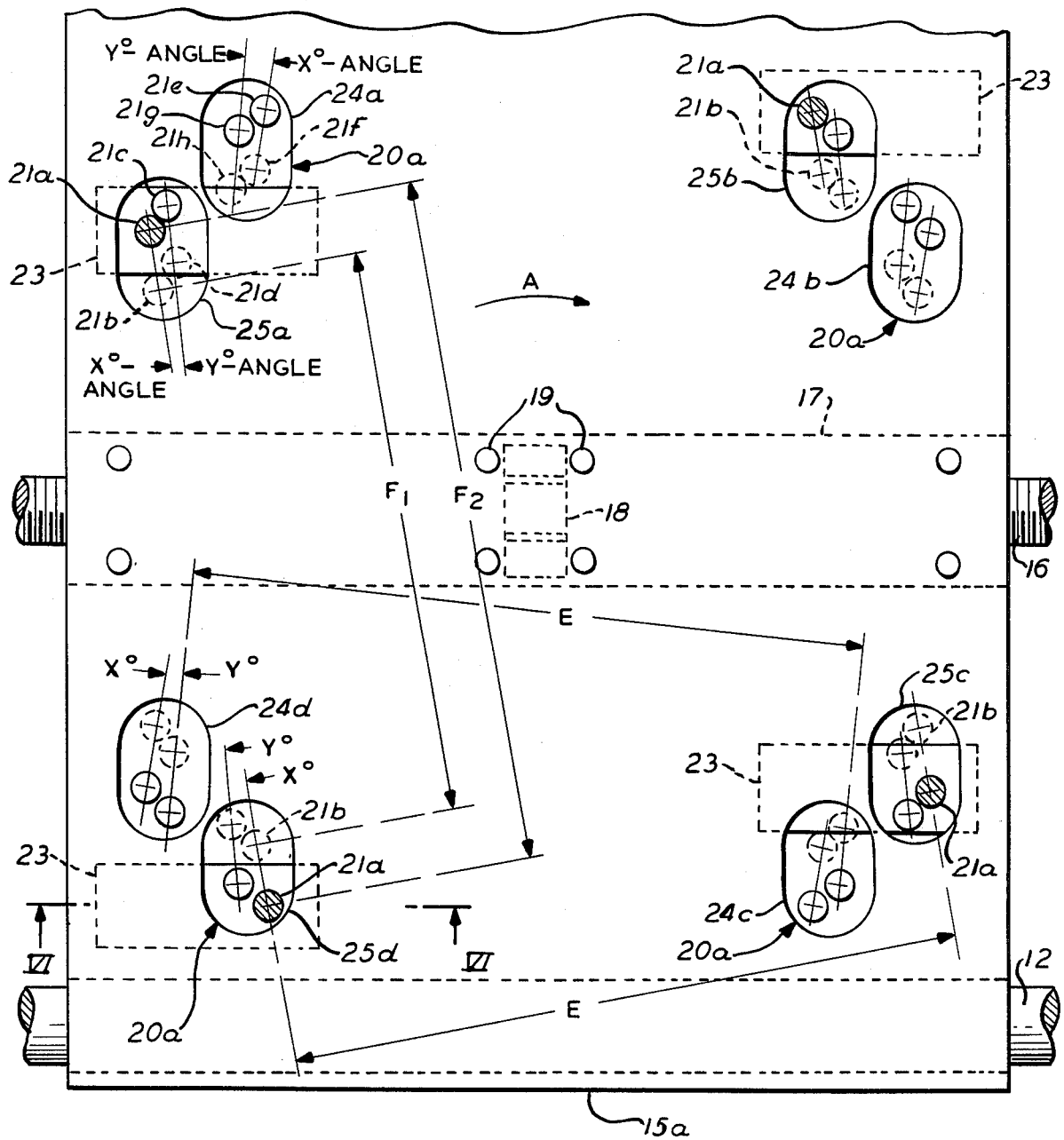
FIG. 5 is a sectional-plan similar to FIG. 2 illustrating a one-piece cross-member for all of the portal openings and with each portal opening composed of a pair of slots in toe-to-heel relation off-set laterally from each other without provision of inter-communication.
Figure 6:
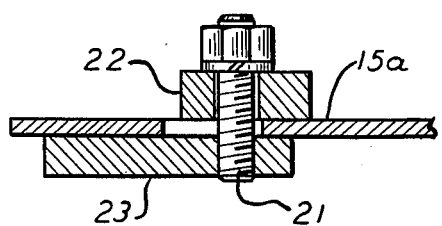
FIG. 6 is a partial sectional view on line VI — VI of FIG. 2.

Commenting on the showing in FIG. 5, there are only two differences from structure of other views and preceeding description. One difference will be seen to be in provision of a single cross member or plate 15a instead of the plurality of cross members 15, 15 of FIG. 2. Let it be said that use of a single or of a plurality of cross members is a matter of choice or of manufacturing expediency and either one may be used. The other difference is that the portal openings 20a of FIG. 5 comprise each a pair of slots, for example, 24a and 25a, somewhat spaced apart and not communicating, but otherwise being similar in direction and projection from each other as previously described with respect to slots 24, 25 of FIG. 2. These portal openings 20a may be employed, if desired, with a plurality of cross members as well as with the single cross member.

A combination of several factors determines the size and arrangement of the eight slots constituting the four portal openings in the carriage of the mount or base. The extent to which this combination of factors affects the construction is made evident by comparison of FIG. 2, where the slots of each portal opening are contiguous at regions of lap, and in FIG. 5, where they are separated at their lapping regions. Specifically the factors are:

(1) The slots have position and capacity to accomodate the E and F dimensions of both of paired motors for which the base is intended to mount;
(2) Latitude for the degree of angular twist at which the motor is to be mounted on the carriage in order for the motor shaft to be parallel to the driven shaft which normally is at the same angular degree as that of the base, but contra thereto;
(3) Adequate range between minimum and maximum degrees of permitted angular twist through which the motor can be moved to be correctly mounted on the carriage, and to compensate for difference, when present, in elevations of the shafts from the plane of a permanent surface parallel to the shafts;
(4) A structure just as effective, irrespective from which end of the motor its shaft projects, or in which direction the slidable flange is urged by its spring.

The carriage shown in FIG. 5 illustrates the relative locations, size and arrangement of the eight slots of the four portal openings which will completely satisfy each of the factors numerated immediately herein above, and which, when proportionately increased to appropriate scale, is illustrative of use for paired motors having NEMA number identifications of 254 and 256.

Continuing with attention focused on FIG. 5, if the base is twisted, for instance 10° for the x-angle in a direction contra to arrow A, and a motor classified as a NEMA number 256 twisted a like amount but in direction of arrow A and mounted on the carriage with the holes of the motor feet superposed properly over slots 25a positioned apart by the F dimensions for the holes are at the positions illustrated of cross-hatched circles 21a. But were the smaller one of the paired motors number 254 positioned with the same twist as just mentioned, then the location of the motor feet holes is represented by dotted line circles 21b in the same slot on a common x-angle line with a respective cross-hatched circle 21a. Shifted location of said dotted line circle 21b is due to the smaller size of the motor and its F1 dimension. Solid line circle 21c and dotted line circle 21d, also shown in the same slot 25a as before involved, correspond to cross-hatched circle 21a and to dotted circle 21b respectively when the designated motors are applied twisted to the smaller y-angle.

In event circumstances require twisting the base and motor oppositely to that involved in the immediately above description, the holes in the motor feet then register with other slots 24a of the portal openings 20a. The circles 21e and 21f on the x-angle line represent motor feet hole locations and correspond to above described circles 21a and 21b respectively, and circles 21g and 21h on the y-angle line correspond to circles 21c and 21d. So it will be seen that the portal openings function with the motor twisted either to the left or right.

The four portal openings in the plates 15 or 15a constituting the carriage top, are comprised of two sets of slots 24 and 25 with the E spacing of the slots of both sets equal to each other and the F spacing equal to each other. For purposes of clarity and to avoid confusion of a double set of slots and construction and dimension lines, the two sets of slots are separately shown in FIGS. 7 and 8, although in practice they do not exist alone. Furthermore, in order to be able to make reference conveniently to any slot individually in these views, alphabetic letters a to d are used with the numerals 24 and 25 for the slots at the respective corners.

Figure 7:
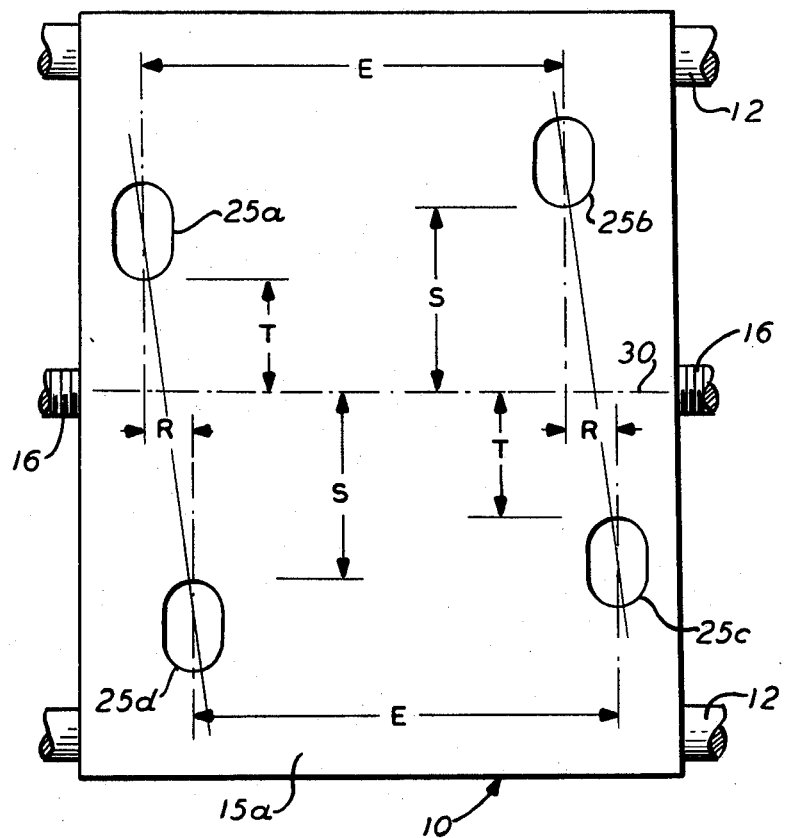
FIGS. 7 and 8 are partial plans separately showing constructional detail of the two sets of each four related portal openings.
Figure 8:
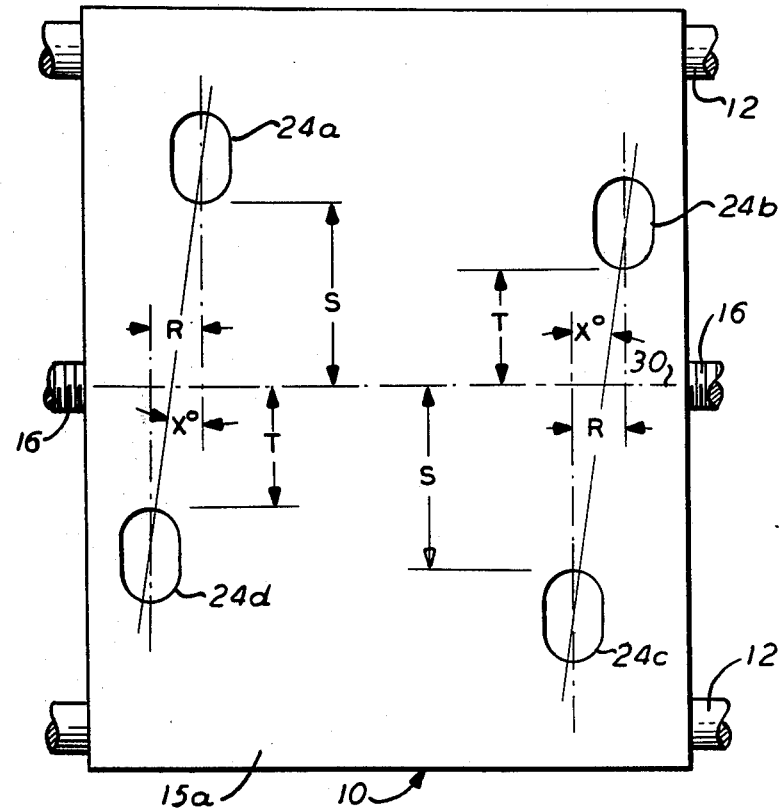

Considering FIG. 7 specifically, the longitudinal centerlines of all four slots of the set of slots to which this view is limited are parallel to each other and perpendicular to the longitudinal centerline 30 of the carriage 10. Slots 25a and 25b are near to one longitudinal side of the carriage and have their centerlines spaced apart a distance substantially that of motor dimension E. Likewise slots 25c and 25d near and perpendicular to the other longitudinal side of the carriage have their centerlines spaced apart also substantially a distance E corresponding in length to the aforesaid distance E between the first mentioned slots 25a and 25b. It should be noted that none of the slot centerlines aline with each other. Instead, centerlines, as a pair, nearest to a respective end of the carriage, which extend in directions toward each other, namely, centerlines of slots 25a and 25d as one pair and centerlines of slots 25b and 25c as another pair, will pass each other at a perpendicular spacing R therebetween.

Diagonally opposite slots 25b and 25d each have their inwardly directed ends spaced a distance S from the centerline of the carriage, whereas the other two diagonally opposite slots 25a and 25c have their inwardly directed longitudinal ends each spaced a distance T from the centerline of the carriage. The distance T is considerably less than the distance S, the positioning of the slots permitting and in part being responsible for the motor twist between the maximum and minimum x and y angular limits previously explained. The distance T added to distance S gives an endwise spacing of the slots with respect to the distance apart of the motor bolt holes to permit easy entry of the motor-securing studs in the slots.

Turning attention to FIG. 8, again there is shown a set of four slots, here identified as 24a, 24b, 24c and 24d, with centerlines parallel to each other and perpendicular to the centerline 30 of the carriage 10 and with a spacing to accomodate the E and F dimensions of the motor. It should be observed however, that whereas in FIG. 7 slots 25b and 25d had closer end approach to their respective sides of the carriage, it is slots 24a and 24c in FIG. 8 that have that distinction. Nevertheless, as in FIG. 7, the centerlines extended of slots 24 are not alined but are spaced apart a distance R in agreement with the same condition prevailing in respect to the slot centerlines in the showing of FIG. 7 and described in detail above. While the relationship of the slots of FIG. 7 permits angular twist of the motor to the right a twist to the left for the motor within the angular x and y limits is available by use of slots 24a, 24b, 24c and 24d of FIG. 8. For further comparison between FIGS. 7 and 8, it may be said that distances S and T also apply in FIG. 8 but with respect to slots at different corners of each set consequential upon the above described difference in location of the respective slots of the two sets.

I claim:

1. A motor mount comprising a longitudinally movable carriage having an upper surface on which a motor is mounted, said surface having stud-receiving portal openings that are elongated in a direction transverse to the longitudinal direction of movement of said carriage, each of said portal openings being composed of a pair of slots each having toe and heel ends with the toe ends projecting in a direction longitudinally away from each other and with the heel ends lapping one with respect to the other, said portal openings being operatively receptive of motor clamping studs therethrough at selected locations ranging from toe to toe of the slots and said portal openings being arranged in a substantial rectangular pattern on the upper surface so that a portal opening is located at each corner of an imaginary right angle rectangle on said upper surface.

2. A motor mount in accordance with claim 1, wherein there are four portal openings and eight said slots constituting the same, each said portal opening including a pair of said slots at corresponding corners of said rectangle.

3. A motor mount in accordance with claim 1, wherein said slots of each said portal opening are parallel to each other.

4. A motor mount in accordance with claim 2, wherein all of said slots are parallel to each other.

5. A motor mount in accordance with claim 1, wherein said heel ends of each pair of slots constituting a portal opening intercommunicate with each other adequately for permitting passage of a stud laterally of itself from one to the other of said pair of slots of a respective portal opening.

6. A motor mount in accordance with claim 1, wherein said slots of each portal opening are parallel to and laterally separated from each other.

7. A motor mount in accordance with claim 1, wherein a motor is fixedly superimposed on the upper surface of said carriage, said motor having a variable pitch pulley with an angularly tapered belt-receiving groove and said carriage having a path of movement substantially in parallelism to the angle of taper of one face of said groove.

8. A motor mount in accordance with claim 7, wherein said motor is mounted on said carriage in an angular relation to the path of movement of the carriage.

9. A motor mount in accordance with claim 1, wherein a motor is secured on and movable with said carriage, said motor being equipped with a variable pitch pulley provided with flanges of which one is axially slidable and the other one nonslidable, said flanges having confronting tapered faces providing a groove adapted to receive a belt therein in radial sinking engagement with said faces thereby being displaced laterally by the face of the nonslidable flange while sinking in wedging engagement in said groove, and said motor in its movement having a substantially equal and opposite simultaneous compensating lateral displacement to the aforesaid displacement of the belt.

* * * * *